Feb. 5, 1952      H. E. MARVEL      2,584,395
FILTER AID FEEDER

Filed Aug. 16, 1946      3 Sheets-Sheet 1

HARVEY E. MARVEL
INVENTOR.

BY Edmund W. C. Kamm
ATTORNEY

Feb. 5, 1952     H. E. MARVEL     2,584,395
FILTER AID FEEDER
Filed Aug. 16, 1946     3 Sheets-Sheet 2
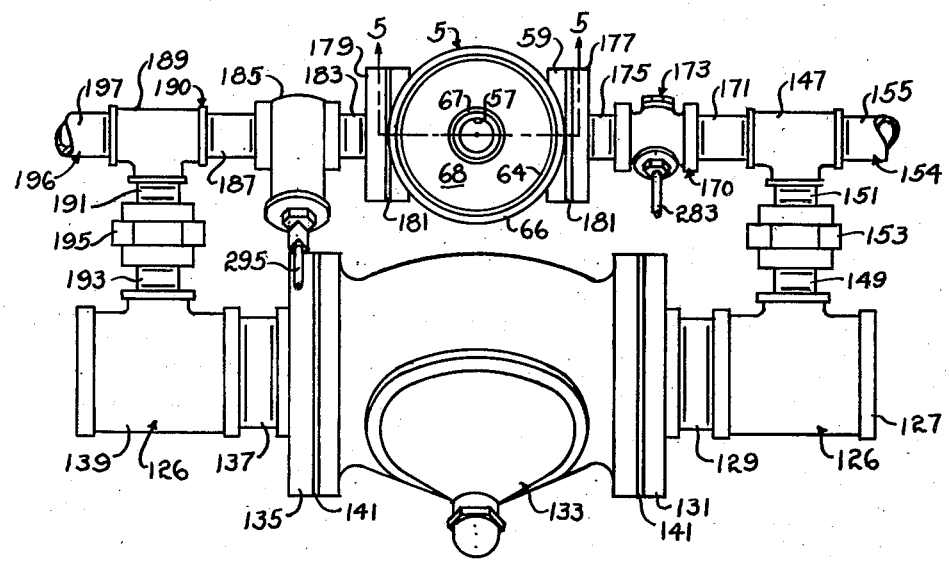
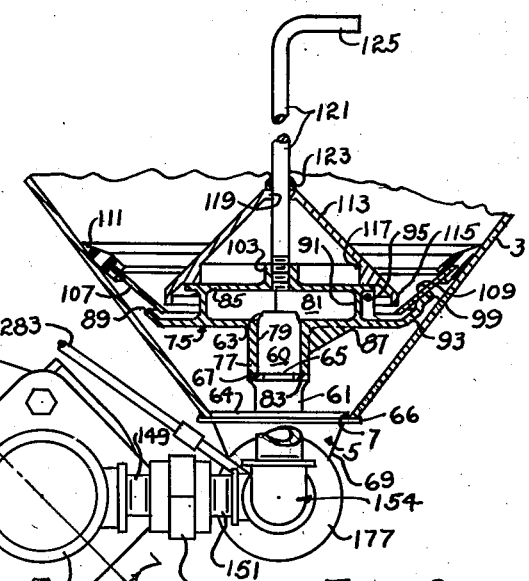
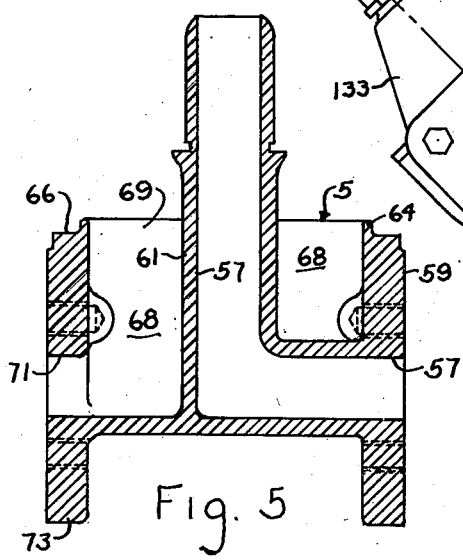
HARVEY E. MARVEL
INVENTOR.
BY Edmund W. E. Kamm
ATTORNEY Feb. 5, 1952     H. E. MARVEL     2,584,395
FILTER AID FEEDER Filed Aug. 16, 1946     3 Sheets-Sheet 3

Harvey E. Marvel
INVENTOR.

BY Edmund W. E. Kamm
ATTORNEY

Patented Feb. 5, 1952

2,584,395

UNITED STATES PATENT OFFICE 2,584,395

FILTER AID FEEDER

Harvey E. Marvel, Fort Wayne, Ind., assignor to Bowser, Inc., Fort Wayne, Ind., a corporation of Indiana Application August 16, 1946, Serial No. 691,001

16 Claims. (Cl. 210—1)

This invention relates to a feeder for filter aid used in filtering liquids; in particular, it relates to a feeder which is used to precoat the elements of a filter with filter aid and to add filter aid, during the filtering cycle, to the unfiltered liquid before it enters the filter to maintain the porosity of the filter cake.

Various slurry feeding devices have been employed in the past but these generally employ agitators, motors, pumps, etc., which are subject to abrasion by the filter aid, are costly, or consume power continuously. Most prior art devices are difficult to adjust to supply the high rate of flow of filter aid required for precoating and the low rate required for filtering.

It is therefore an object of this invention to provide a slurry feeder having a relatively wide feed range.

It is another object of this invention to provide a slurry feeder which operates on the erosion principle.

It is still another object of this invention to provide a slurry feeder constructed to withstand the abrasiveness of the filter aid.

It is still another object of this invention to provide a slurry feeder having no continuously moving parts.

It is still another object of this invention to provide a slurry feeder that is operated solely by liquid supplied by the pump.

It is still another object of this invention to provide a slurry feeder having a visible indicator to show when the supply of filter aid is becoming exhausted.

It is still another object of this invention to provide a slurry feeder that can be refilled without interrupting the operation of the filter.

It is still another object of this invention to provide visible means to control the quantity of filter aid flowing from the slurry feeder.

It is yet another object of this invention to provide a slurry feeder having parts that are standard for various capacities of tanks.

These and other objects of the invention will become apparent from a study of the specification and the drawings which are attached hereto and made a part hereof, and in which:

Figure 2 is a sectional view of the slurry feeder tank cone and the erosion device taken on the line 2—2 of Figure 1.

Figure 3 is a view of the piping which is disposed underneath the tank.

Figure 5 is a section of the inlet-outlet manifold taken on the line 5—5 of Figure 3.

Figure 1:
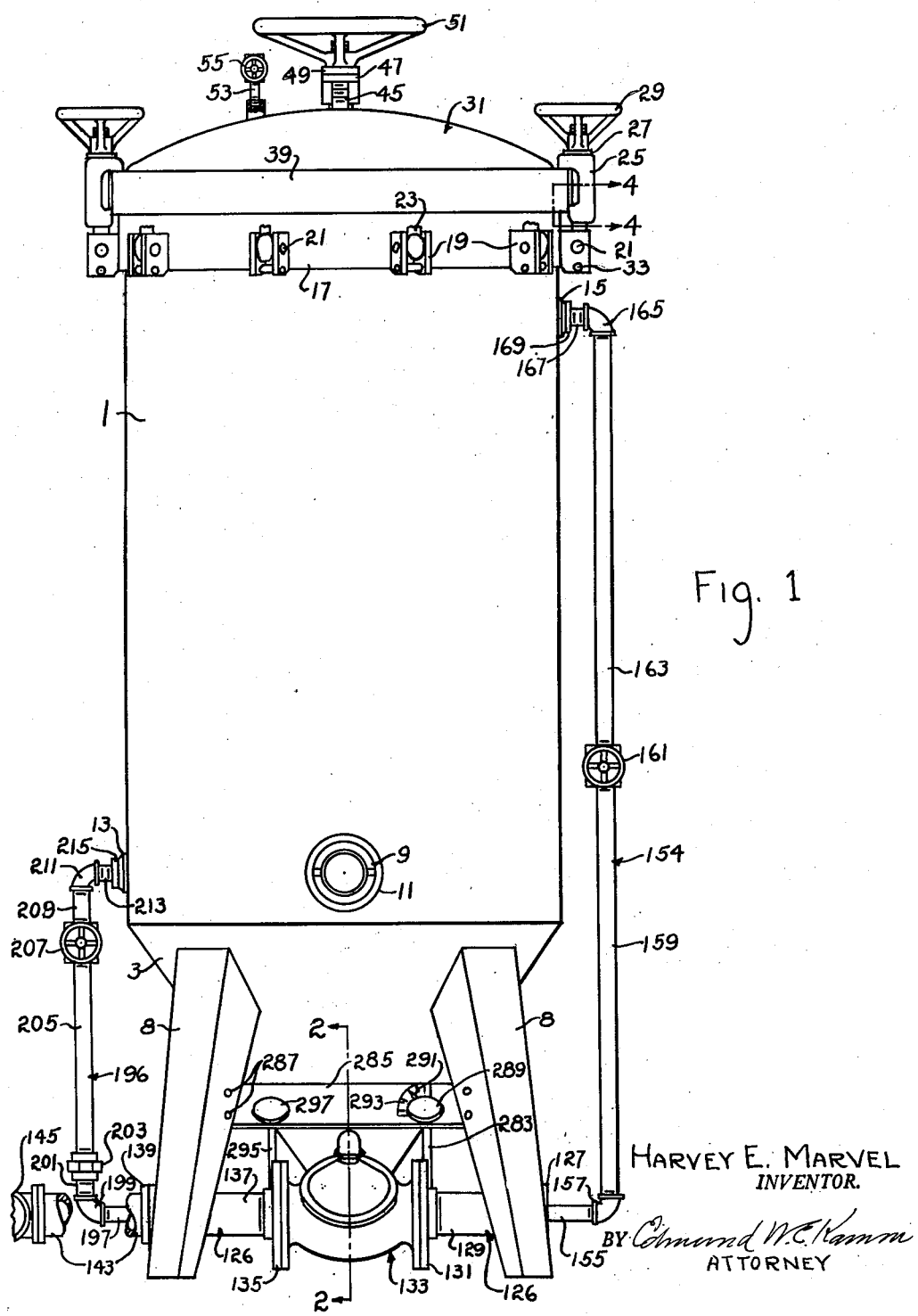
Figure 1 is an elevation showing the slurry feeder and general arrangement of the piping and valves.

Referring to Figures 1, 2 and 3 of the drawings, the numeral 1 designates a cylindrical tank with a conical bottom 3 which terminates in an opening 7 at its apex. An inlet-outlet manifold 5 (to be described later) is welded in place to cover the opening 7. Legs 8 are welded to the outside of the cone and support the tank.

A bull's-eye type of sight glass 9 is screwed into a flange 11 welded into the cylindrical portion of the tank immediately adjacent the cone.

A flange 13 is welded in the cylindrical portion of the tank at the approximate level of the sight glass and is preferably spaced 90 degrees therefrom. Another flange 15, similar to the flange 13, is welded into the tank near the top and spaced 180 degrees from 13.

Figure 4:
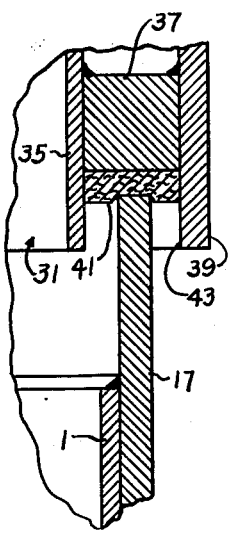
Figure 4 is a section taken on the line 4—4 of Figure 1 showing the seal between the tank and the head.

A band 17 is welded around the outside of the tank at the top and allowed to project above the top of the tank (see Figure 4).

A plurality of pairs of lugs 19 are welded about the circumference of the band, are equally spaced and carry pins 21 which pass through the eyes of bolts 23. A hold down lug 25 and a washer 27 pass over each of the eye bolts and a handwheel 29 is screwed on the bolt. These parts clamp the head 31 tightly against the top of the band 17. A gasket seat 37, preferably rectangular in section, is welded around the head flange 35 above the bottom thereof, and a circular band 39 is welded to the exterior of the seat 37 and projects downwardly until it is flush with the bottom of the flange and projects upwardly above the gasket seat so that it may be engaged by lugs 25.

A gasket 41 is pressed into the groove 43 formed by the head flange, the seat and the band. A liquidtight joint is made between the head and the tank by compressing the gasket upon the top of the flange 17 by screwing the handwheels down on the eyebolts, the lugs 25 hooking over the top of the band 39.

A stud 45 is welded to the top, center of the head and is threaded on its upper end. A crane 47, having a bearing on the tank 1, has an arm 49 passing over the stud and a handwheel 51, above the arm, engages the threads on the stud to raise and lower the head.

A vent pipe 53 having a valve 55 is fixed in the head and communicates with the tank.

The manifold 5 (Figs. 2, 3 and 5) has a channel 57 entering through the flange 59 and extending upward through a tube 61. The tube is provided at its upper end with a pilot 60 which is provided with a convex nose 63. A flange 67 is formed on the pipe below the pilot and a groove 65 is formed between them.

An axially directed flange 64, concentric with the tube 61, extends above a radial flange 66 which is disposed at a level slightly above the top of flange 59. The flange 64 is smaller than the hole 7 in the cone and the flange 66 is larger than the hole, so that the cone rests on the flange 66 and is welded to the flange 64. A chamber 68 is formed by the wall 69 and tube 61 and extends down from flange 66 and tapers into the radius of the metal which forms the channel 57. The chamber 68 is connected to an outlet 71 in flange 73 which is similar to flange 59.

The erosition device 75 (see Figs. 2 and 6) has a depending neck portion 77 provided with an inlet channel 79 extending upward and into the chamber 81. The device is slipped over pilot 60 of the manifold 5 and seats upon a gasket 83 which rests in the groove 65.

Figure 6:
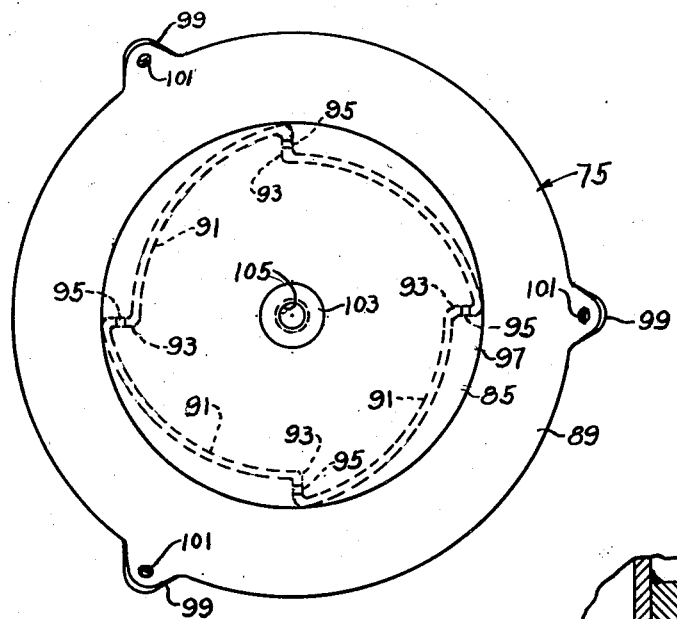
Figure 6 is a plan view of the erosion apparatus.

The chamber 81 has a top wall 85, a bottom wall 87, and vertical side walls 91 joining them. The side walls 91, as shown in Fig. 6, include diametrically opposed, radially extending sections 93, each of which has its inner end joined with the outer end of the next section which is disposed clockwise with respect to it. An opening is formed in each section 93 so that its axis is perpendicular to the section.

The bottom wall 87 extends beyond the walls 91—93 and is provided with a rim portion 89 which is directed upwardly at approximately 45 degrees to the horizontal and the edge of the rim is provided with tabs or bosses 99, each of which is provided with a tapped hole 101.

An inverted conical feeder 107 of sheet metal or other suitable material is secured to the erosion device by screws 109 passing through holes in the feeder and engaging the tapped holes 101. The feeder is open at the bottom and is mounted in position with its bottom edge approximately ¼" above the top of the flange 89 but below the rim thereof. A U-shaped gasket 111 extends around the top edge of the feeder and engages the inside wall of the cone 3.

The top wall 85 is circular in plan, as shown in Fig. 6, and projects beyond the walls 91 except at the point of juncture with sections 93. The openings 95 are preferably located near the corners formed by the walls 91 and 85, as is clearly shown in Fig. 2.

A conical-shaped spreader 113 has a downwardly turned flange 115 and an inwardly extending circular projection 117 which rests upon the top wall 85 of the erosion device with the flange 115 extending down to about the level of the lower sides of holes 95. A hole 119 at the apex of the spreader permits passage of a rod 121 having a collar 123 welded or pinned just above the spreader and the bottom end threaded to engage the tapped hole 105 in the exchanger. The top end of the rod extends up near the top of the tank and is bent at right angles, as shown at 125, to provide a handle for use when inserting and removing the assembly which is comprised of the erosion device, the conical feeder, the spreader and the rod from the pilot 60.

The piping is arranged as shown in Figs. 1, 2 and 3. The main line 126 into which liquid is discharged by the pump is comprised of the tee 127 which connects through nipple 129 and flange 131 with a back pressure valve 133. The main line continues on the outlet side of the valve through the flange 135, nipple 137 and the tee 139. Gaskets 141 seal the flanges on the valve 133 with the flanges 131 and 135. Another nipple 143 (Fig. 1) connects the tea 139 to a sight glass 145.

The center outlet on tea 127 is connected with the center connection of a tea 147 through nipples 149 and 151 and union 153. The right-hand branch 154 leading from the tee 147 (Fig. 3) is connected by means of nipple 155, elbow 157, pipe 159, gate valve 161, pipe 163, elbow 165, nipple 167 and flange 169 to the flange 15 at the top of the tank. The left-hand branch 170 (Fig. 3) leading from the tee 147 is connected by means of nipple 171, plug cock 173, nipple 175 and flange 177 to the channel 57 of the manifold 5.

A flange 179 is bolted to the outlet side of the manifold (gaskets 181 being used on both the inlet and outlet sides of the manifold) and nipple 183, gate valve 185 and nipple 187 connect the flange with the tee 189 to form line 190. The central outlet of tee 189 is joined to the corresponding outlet of tee 139 by nipples 191 and 193 and union 195. The remaining branch 196 leading from the tee 189 is comprised of nipple 197, elbow 199 (Fig. 1), nipple 201, union 203, pipe 205, gate valve 207, nipple 209, elbow 211, nipple 213 and flange 215 and is connected to the flange 13 at the bottom of the tank.

Figure 7:
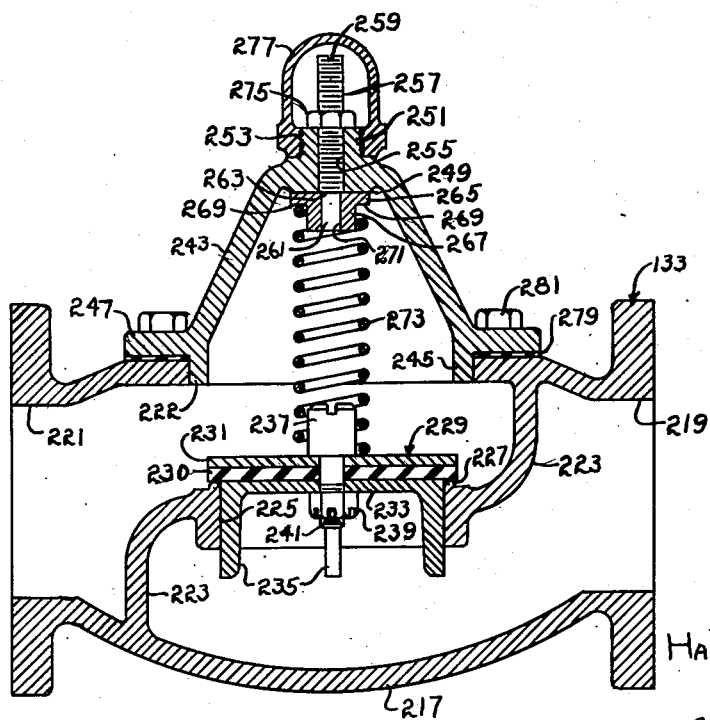
Figure 7 is a sectional view of the back pressure valve taken on the line 7—7 of Figure 2.

The back pressure valve 133, as shown in Fig. 7, has a body 217 having an inlet 219, an outlet 221 and a circular bore 222 entering from the top. A wall 223 separates the inlet from the outlet and has a circular port 225 in the horizontal plane. A seat 227 is formed on the upper side of the port. The valve 229 is comprised of the circular disc 230 of rubber or other suitable material, a top metal follower 231 the same diameter as the disc and a bottom support 233 having guides 235 engaging the wall of port 225. The disc, support and follower are assembled into the valve assembly and held in place by the shoulder stud 237, castellated nut 239 and cotter pin 241 which engages the slots in the nut and passes through a hole in the lower or threaded portion of the stud.

The cone-shaped bonnet 243 of the valve 133 has a pilot flange 245 entering the bore 222. Directly above the pilot is an outwardly extending circular flange 247. Suitable fasteners 281 hold the bonnet against a gasket 279 on the valve body.

A boss 249 extends a short distance down from the top of the bonnet and another boss 251 extends upward directly above boss 249 and is threaded on the outside as shown at 253. A hole 255 is drilled and tapped through both bosses.

An adjusting screw 257, having a screw driver slot 259 and a projection 261 at the bottom to form a shoulder 263, is screwed into the hole 255.

The spring guide 265 having a smaller diameter 267 on the lower end to form a shoulder 269 is provided with a concentric hole 271 which receives the projection 261 of the adjusting screw.

A compression spring 273 seats at the top upon the shoulder 269 of the guide and at the bottom upon the top follower 231 around the head of the shoulder stud 237.

A lock nut 275 holds the adjusting screw in position and cap 277 screwed on threads 253 prevents leakage.

The plug cock 173 (Figs. 1 and 3) has an extension 283 directed upward at an angle and through a panel 285 which is mounted by screws 287 on and between two of the legs 8. The extension terminates in a knob 289 having a pointer 291 attached to the back of the knob. Both the knob and the pointer are movable as a unit over a 90-degree arc to regulate and indicate the position of the cock on the graduated dial 293 which is fixed to the panel.

The gate valve 185 has a similar extension 295 directed upward at an identical angle to the first extension and also projects through the panel 285. A knob 297 is fixed on the end of the extension projecting through the panel.

Operation

The slurry feeder has its inlet 127 connected with a pump and its outlet with a filter through sight glass 145. It is assumed that the cover is open and that the erosion mechanism is in place.

In the preferred operation the pump is started with valves 185 and 207 closed and 161 and 173 open and the tank 1 is filled to the level of the sight glass 9, whereupon the pump is stopped. The object of this step is to prevent a great deal of powder from flowing down into the chamber 68.

The tank is next filled with diatomaceous earth to any desired level below the inlet 169. Thereafter the cover 31 is swung over the opening in the tank by means of crane 47 and is lowered by means of the wheel 51 until gasket 41 is seated on 17. The clamps 25 are applied and handwheels 29 draw the cover down.

With the vent valve 55 open, the pump is again started and liquid is fed into the tank until it issues from the vent. The latter is then closed. If it is not desired to precoat, valve 161 is also closed; but if precoating is necessary this valve is left open and, in either case, valve 185 is also opened.

Assuming that precoating is to be carried out, the valves 173 and 185 are opened wide and as liquid flows in to 127 and valve 133, the poppet 229 lifts against the action of spring 273, which is usually set to apply from 5 to 15 pounds pressure on the valve, and a differential pressure is set up across the valve; that is, the pressure in lines 154 and 170 exceeds the pressure in line 190. Therefore, liquid will flow by way of line 154 into the top of the tank and will wash powder downwardly along cones 107 and 113, out over the rim 89 into chamber 68 of the manifold and by way of line 190 to the outlet 139 and thence to the filter.

At the same time, liquid will flow through line 170 into chamber 81, out through the holes 95 to produce a swirling action underneath the projecting portion of cone 113 and assist in washing powder down onto the projection of the bottom 87 and out over the rim 89 into the manifold 68 and to the filter.

When precoating is completed (this is usually evidenced by a clear filtrate) the valve 161 is closed and the valve 173 is regulated until the proper amount of powder feed is attained. This is determined by observing the effluent of the feeder in the sight glass 145. The pointer 291 and scale 293 serve to indicate the approximate rate of feed of powder during filtration.

As soon as valve 161 is closed, the erosion device alone provides the powder feed. The jets of liquid issuing through the orifices or holes 95 due to the differential pressure created by valve 133, creates a swirl of liquid about the underside of cone 113, the bottom 87 and up onto the surface of cone 107 so as to erode or wash powder down through the space between the cones, across the bottom 87 underneath cone 107 and then over the rim 89 into the manifold. The powder is then passed by way of line 190 to tee 126 where it becomes mixed with the liquid issuing from valve 133. The powder, being heavier than liquid, settles and is fed out by the erosion device. The major portion of the output of the pump will, of course, flow through valve 133 because the orifices 95 being only about an eighth of an inch in diameter and being only four in number cannot pass a very large flow of liquid.

It should be here noted that in the diatomaceous earth available commercially there exists numerous small pellets which would plug a screen. In the instant device however, the balls or pellets are quickly disposed of either by being broken up in the swirl or by being simply washed over the rim into the manifold.

Another feature of the device resides in the fact that if a container having wetted diatomaceous earth is allowed to stand for a few hours without agitation, the material collects at the bottom of the vessel in a rubbery mass which it is practically impossible to feed. In the instant device however, when the powder settles on the cones, the orifices being protected by the cones are free from the earth and as soon as the pump is started the jets begin to erode the powder and feeding is again started. The material has remained in the feeder for as long as two days without causing it to be disabled. Upon application of unfiltered liquid under pressure, the feed was established at once and maintained until the feeder was empty.

In the event the supply of powder reaches the level of the bull's-eye before filtration is completed, the valves 173, 185 and 161 are closed while valve 207 is opened. A gas line is attached to the vent and valve 55 is opened. The contents of the tank are forced out through line 13, 211, 209, 205, 197, 191, 193 into T 126. The pump is not shut down so that unfiltered liquid is passing through the T 126 at the same time. The valve 207 is closed, the gas line is detached, the cover is then removed and additional powder is added. When the cover has been replaced, liquid is again introduced through valve 161 until it appears at the vent valve 55 which is thereupon closed. The valves 185 and 173 are again opened to restore the flow through the eroding device and the feeding of powder proceeds as before.

When the end of the run is reached, the powder remaining in the slurry feeder may be blown from the tank by applying the gas line again to the vent and by closing valve 173. The gas will force all of the powder and liquid from the tank through the manifold chamber 68 and into the filter.

To clean the feeder, it is first disconnected from the pump and filter and the cover is removed. The cones and erosion device as a unit may then be lifted from the tank by means of handle 125 so that it may be washed down. If desired, the rod 121 may be unscrewed from boss 103 so that the spreader cone 113 may be removed. These parts may then be washed and sterilized.

The steps required to reassemble the feeder are obvious.

It should be noted that in the event the rate of powder feed is not heavy enough with valve 173 wide open, additional feed may be obtained by adjusting the screw 259 to increase the pressure of spring 273 on the valve 229. This increases the differential pressure and, consequently, the rate of flow of liquid through the orifices. The increase in velocity of the jets increases their capacity for eroding powder so that the flow will be increased. A reverse effect will, of course, be experienced if the differential pressure is dropped by decreasing the spring pressure.

In some cases, depending upon the nature of the installation and other conditions, it may be desired to increase the flow of powder without increasing the differential pressure. In such case, the orifices 95 may be increased slightly in size so that the volume of liquid in the jets is increased.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter aid feeder, the combination of a tank having a bottom, a flow line communicating with the tank through the bottom thereof, a downwardly directed frusto-conical, filter aid supporting baffle, means for supporting the baffle across said tank above the bottom thereof, said baffle having an opening at its lower end, a jet forming device disposed below said opening, and means for discharging liquid through said device adjacent the baffle to feed filter aid therefrom into said flow line.

2. In a filter aid feeder, the combination of a tank having a bottom, a flow line communicating with the tank through the bottom thereof, a downwardly directed, frusto-conical, filter aid supporting baffle, means for supporting the baffle across said tank above the bottom thereof, said baffle having an opening at its lower end, an upwardly directed cone mounted centrally above said opening and forming with the baffle an annular opening for the discharge of filter aid, a liquid jet forming device disposed below said opening, and means for discharging liquid through said device adjacent the baffle to feed filter aid therefrom into said flow line.

3. In a filter aid feeder, the combination of a tank having a bottom, a flow line communicating with the tank through the bottom thereof, a downwardly directed, frusto-conical, filter aid supporting baffle, means for supporting the baffle across said tank above the bottom thereof, said baffle having an opening at its lower end, an upwardly directed cone mounted centrally above said opening and forming with the baffle an annular opening for the discharge of filter aid, a jet forming device disposed below said cone but above the lower edge of said frusto-conical baffle and adapted to direct jets of liquid tangentially of said baffle to create a swirl which will cause filter aid to be taken from said baffle and carried in suspension by said liquid, means for supplying liquid to said device, and means for conveying said liquid and suspended filter aid to said flow line.

4. In a filter aid feeding device, the combination of a tank having a bottom, inlet and outlet conduits in the bottom, said inlet conduit terminating in a fitting, a jet forming device having a complementary fitting adapted to be supported on the inlet conduit, said device having a radially directed bottom flange terminating in an upwardly directed rim, an inverted frusto-conical baffle attached to said rim, said baffle terminating above said flange but below said rim and being spaced inwardly from the rim, sealing means on the upper end of the baffle adapted to engage and seal against the tank, an upright cone disposed over said device and having its lower end disposed in spaced relation with respect to said baffle to provide an annular opening therebetween, and means for supplying liquid under pressure to said device through said inlet so that filter aid deposited on the cone and baffle will be washed to the flange and over the rim thereof into said outlet.

5. In a filter aid feeding device, the combination of a tank having a bottom, inlet and outlet conduits in the bottom, said inlet conduit terminating in a fitting, a jet forming device having a complementary fitting adapted to be supported on the first named fitting, said device having a radially directed bottom flange terminating in an upwardly directed rim, an inverted frusto-conical baffle attached to said rim, said baffle terminating above said flange but below said rim and being spaced inwardly from the rim, sealing means on the upper end of the baffle adapted to engage and seal against the tank, an upright cone disposed over said device and having its lower end disposed in spaced relation with respect to said baffle to provide an annular opening therebetween, said device comprising means forming a chamber, means forming a plurality of tangentially directed jet forming orifices in said chamber, adjacent said baffle and flange, said orifices being adapted to form a swirl of liquid adjacent said baffle, and means for supplying liquid under pressure to said chamber through said inlet so that filter aid deposited on the cone and baffle will be washed to the flange and over the rim thereof to said outlet.

6. In a filter aid feeding device, the combination of a tank having a bottom, inlet and outlet conduits in the bottom, said inlet conduit terminating in a fitting, a jet forming device having a complementary fitting adapted to be supported on the first named fitting, said device having a radially directed bottom flange terminating in an upwardly directed rim, an inverted frusto-conical baffle supported in the tank and terminating above said flange but below said rim and being spaced inwardly from the rim, sealing means on the upper end of the baffle adapted to engage and seal against the tank, an upright cone disposed over said device and having its lower end projecting beyond said device and disposed in spaced relation with respect to said baffle to provide an annular opening therebetween, said device comprising means forming a chamber, means forming a plurality of tangentially directed jet forming orifices in said chamber, adjacent said baffle and above the flange, said orifices being above the level of the lower end of said baffle and adapted to form a swirl of liquid adjacent said cone, and means for supplying liquid under pressure to said chamber through said inlet so that filter aid deposited on the cone and baffle will be washed to the flange and over the rim thereof to said outlet.

7. In a filter aid feeding device, the combination of a tank having a bottom, inlet and outlet conduits in the bottom, said inlet conduit terminating in a fitting, a jet forming device having a complementary fitting adapted to be supported on the first named fitting, said fittings being telescopically connectable, said device having a radially directed bottom flange terminating in an upwardly directed rim, an inverted frusto-conical baffle attached to said rim, said baffle terminating above said flange but below said rim and being spaced inwardly from the rim, sealing means on the upper end of the baffle adapted to engage and seal against the tank, an upright cone disposed over said device and fixed thereto so that said cone, baffle and device are removable as a unit, and having its lower end disposed in spaced relation with respect to said baffle to provide an annular opening therebetween, said device comprising means forming a chamber, means forming a plurality of tangentially directed jet forming orifices in said chamber adapted to form a swirl of liquid adjacent said cone, and means for supplying liquid under pressure to said chamber through said inlet so that filter aid deposited on the cone and baffle will be washed to the flange and over the rim thereof to said outlet.

8. In a filter aid feeder, the combination of a flow line for unfiltered liquid, means for creating a differential pressure in said line, a filter aid tank, means in said tank upon which the filter aid settles, means forming an opening in the supporting means, liquid jet forming means disposed adjacent the opening, said jet forming means comprising means forming a chamber, means forming a plurality of substantially tangentially directed orifices, a conduit connecting said jet forming means with the flow line on the high pressure side of said differential pressure means, and a discharge conduit connecting said tank below the opening with the flow line on the low pressure side of said differential pressure means, said jet forming means being disposed to form a swirl of liquid adjacent said opening to dislodge the filter aid therefrom into said discharge conduit.

9. In a filter aid feeder the combination of a flow line for unfiltered liquid, a closed filter aid tank, supporting means in said tank disposed so as to receive the filter aid as it settles, said flow line being connected to an outlet conduit for said tank, conduits connecting said tank, both above and below the supporting means, with a supply of liquid under pressure, valves in said conduits, means forming an annular opening in said supporting means, liquid jet forming means connected to said lower conduit and directed so as to create a swirl of liquid in said opening for dislodging said filter aid from the supporting means and passing it through said opening, and said dislodged filter aid passing to said flow line through said outlet conduit.

10. In a filter aid feeder the combination of a flow line for unfiltered liquid, a closed filter aid tank, supporting means in said tank disposed so as to receive the filter aid as it settles, said flow line being connected to an outlet conduit for said tank, inlet conduits connecting said tank, both above and below the supporting means, with a supply of liquid under pressure, valves in said conduits, means forming an annular opening in said supporting means, liquid jet forming means connected to said lower inlet conduit and directed so as to create a swirl of liquid in said opening for dislodging said filter aid from the supporting means and passing it through said opening, and said dislodged filter aid passing to said flow line through said outlet conduit, both of said inlet conduits cooperating to discharge a heavy flow of filter aid, said lower conduit and the jet forming means operating alone to discharge a regulated, lighter flow.

11. In a filter aid feeder the combination of a flow line for unfiltered liquid, means for creating a differential pressure in said line, a closed filter aid tank, an inverted, frusto-conical supporting baffle in said tank having upper and lower openings, means for mounting said baffle coaxially in the tank so as to receive the filter aid as it settles, the conical formation of the baffle tending to urge the filter aid toward the lower opening, said flow line being connected at the low pressure side of said differential pressure means to an outlet conduit for said tank, conduits connecting said tank, both above and below the supporting means, with the flow line, on the high pressure side of said differential pressure means, valves in said conduits, liquid jet forming means connected to said lower conduit and directed so as to create a swirl of liquid in said lower opening for dislodging said filter aid from the baffle and passing it through said opening, and to said flow line, through said outlet conduit.

12. In a filter aid feeding device, the combination of a tank having a bottom, inlet and outlet conduits in the bottom, said inlet conduit terminating in a fitting, a jet forming device having a complementary fitting adapted to be supported on the first named fitting, said device having a radially directed bottom flange terminating in an upwardly directed rim, an inverted frusto-conical baffle supported in the tank and terminating above said flange but below said rim and being spaced inwardly from the rim, sealing means on the upper end of the baffle adapted to engage and seal against the tank, an upright cone disposed over said device and having its lower end disposed in spaced relation with respect to said baffle to provide an annular opening therebetween, said device comprising means forming a chamber, means forming a plurality of tangentially directed jet forming orifices in said chamber, adjacent said baffle and flange, said orifices being adapted to form a swirl of liquid adjacent said baffle, and means for supplying liquid under pressure to said chamber through said inlet so that filter aid deposited on the cone and baffle will be washed to the flange and over the rim thereof to said outlet.

13. In a filter aid feeding device, the combination of a tank having a bottom, inlet and outlet conduits in the bottom, said inlet conduit terminating in a fitting, a jet forming device having a complementary fitting adapted to be supported on the first named fitting, said device having a radially directed bottom flange terminating in an upwardly directed rim, an inverted frusto-conical baffle supported in the tank and terminating above said flange but below said rim and being spaced inwardly from the rim, means forming a seal between the upper end of the baffle and the tank, an upright cone disposed over said device and having its lower end disposed in spaced relation with respect to said baffle to provide an annular opening therebetween, said device comprising means forming a chamber, means forming a plurality of tangentially directed jet forming orifices in said chamber, adjacent said baffle and flange, said orifices being adapted to form a swirl of liquid adjacent said baffle, and means for supplying liquid under pressure to said chamber through said inlet so that filter aid deposited on the cone and baffle will be washed to the flange and over the rim thereof to said outlet.

14. In a device for feeding into a liquid, a finely divided, granular filter aid which is heavier than and insoluble in the liquid but is capable of suspension therein, the combination of a tank, a perforate means disposed within said tank above the bottom thereof to form a single bottom chamber and to support a body of said filter aid, an inlet and an outlet for liquid communicating with each other through said single bottom chamber of said tank below said perforate means, and liquid jet forming means communicating with said inlet, disposed adjacent said perforate means and comprising means for creating a swirl of liquid in contact with the body of filter aid adjacent it to continuously erode granules of filter aid therefrom for movement downwardly through the perforate means into suspension in the liquid flowing to the outlet.

15. In a device for feeding into a liquid, a finely divided, granular filter aid which is heavier than and insoluble in the liquid but is capable of suspension therein, the combination of a tank, a perforate means disposed within said tank above the bottom thereof to form a single bottom chamber and to support a body of said filter aid, an inlet and an outlet for liquid communicating with each other through said single bottom chamber of said tank below said perforate means, said perforate means comprising filter aid supporting surface means inclined and converging toward an opening therein, and swirl forming means communicating with said inlet, disposed adjacent the opening for creating a swirl in the liquid in contact with the body of filter aid adjacent the opening, said swirl serving to continuously erode granules of filter aid therefrom for passage downwardly through said opening into suspension in the liquid passing to the outlet.

16. In a device for feeding into a liquid, a finely divided, granular filter aid which is heavier than and insoluble in the liquid but is capable of suspension therein, the combination of a tank, a perforate means disposed within said tank above the bottom thereof to form a single bottom chamber and to support a body of said filter aid, an inlet and an outlet for liquid communicating with each other through said single bottom chamber of said tank below said perforate means, and hydraulic means communicating with said inlet, disposed adjacent said perforate means and acting upon said body of filter aid to continuously erode granules therefrom for movement downwardly through the perforate means into suspension in the liquid passing to said outlet, said perforate means comprising filter aid supporting surface means defining an opening and converging thereon, said surface means being disposed at a slope to urge filter aid toward the opening to replace that removed by said hydraulic means.

HARVEY E. MARVEL.

REFERENCES CITED

The following references are of record in the file of this patent:

UNITED STATES PATENTS

| Number | Name | Date |
| --- | --- | --- |
| 423,773 | Jewell | Mar. 18, 1890 |
| 667,559 | Neubauer | Feb. 5, 1901 |
| 1,276,653 | Herbert et al. | Aug. 20, 1918 |
| 1,409,248 | Sevcik | Mar. 14, 1922 |
| 2,142,947 | Kretzschmar et al. | Jan. 3, 1939 |
| 2,216,921 | Marvel | Oct. 8, 1940 |
| 2,227,646 | Hillman | Jan. 7, 1941 |
| 2,462,886 | Morrow | Mar. 1, 1949 |